(12) United States Patent
Young et al.

(10) Patent No.: US 9,924,363 B2
(45) Date of Patent: Mar. 20, 2018

(54) WIRELESS SECURITY SYSTEM FOR WIRELESS AUDIO DEVICE

(71) Applicant: Bose Corporation, Framingham, MA (US)

(72) Inventors: Douglas Warren Young, Arlington, MA (US); David A. Howley, Franklin, MA (US); Misha K. Hill, Jamaica Plain, MA (US); Douglas C. Moore, North Grafton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/188,337

(22) Filed: Jun. 21, 2016

(65) Prior Publication Data

US 2017/0366973 A1 Dec. 21, 2017

(51) Int. Cl.
| | |
|---|---|
| *H04M 1/68* | (2006.01) |
| *H04W 12/08* | (2009.01) |
| *H04W 4/00* | (2018.01) |
| *H04L 12/26* | (2006.01) |
| *H04W 4/02* | (2018.01) |

(52) U.S. Cl.
CPC ............. *H04W 12/08* (2013.01); *H04L 43/16* (2013.01); *H04W 4/008* (2013.01); *H04W 4/021* (2013.01)

(58) Field of Classification Search
CPC ..... H04W 12/08; H04W 4/021; H04W 4/008; H04L 43/16
USPC ........................................................ 455/411
See application file for complete search history.

(56) References Cited

U.S. PATENT DOCUMENTS

| | | | |
|---|---|---|---|
| 6,275,258 B1 * | 8/2001 | Chim | H04N 5/232 |
| | | | 348/169 |
| 9,467,771 B2 * | 10/2016 | Eckardt | H04R 1/1041 |
| 9,762,195 B1 * | 9/2017 | Tao | G01S 15/06 |
| 2016/0029118 A1 | 1/2016 | Ueda | |

* cited by examiner

*Primary Examiner* — Amancio Gonzalez

(57) ABSTRACT

A wireless audio device includes one or more electroacoustic transducers and a first wireless transceiver. The device also includes a processor configured to (a) process audio signals received by the transceiver in a first received signal and communicate the processed audio signals to the transducer(s) to cause the transducer(s) to output sound pressure waves, (b) determine that a characteristic of a second received signal independent of the first received signal surpassed at least one threshold, and (c) change a state of the audio device based on the determining.

22 Claims, 4 Drawing Sheets

WIRELESS SECURITY SYSTEM FOR WIRELESS AUDIO DEVICE

BACKGROUND

The present invention relates to providing security for a demonstration model of a wireless audio device.

In general, Bluetooth® wireless technology is a wireless communications system intended to replace the cables connecting electronic devices. Devices may be connected for various purposes, including remote control, exchange of data, or playback of audio signals generated by one device on a speaker in another device. In the context of this application, when we refer to "Bluetooth" we are referring to protocols and connections operating according to the version of the Bluetooth specification released by the Bluetooth Special Interest Group (Bluetooth SIG) as of the filing date of this application, which is Version 5.0, 16 Jun. 2016. Other wireless technologies may provide similar features and capabilities and may be used in the same manner.

SUMMARY

In general, in one aspect, a wireless audio device includes one or more electroacoustic transducers and a first wireless transceiver. The device also includes a processor configured to (a) process audio signals received by the transceiver in a first received signal and communicate the processed audio signals to the transducer(s) to cause the transducer(s) to output sound pressure waves, (b) determine that a characteristic of a second received signal independent of the first received signal surpassed at least one threshold, and (c) change a state of the audio device based on the determining.

Implementations may include one or more of the following, in any combination. The processor is configured to determine that the audio device has been moved one or more set distances based on the characteristic of the second received signal. The processor is configured to determine that the audio device has been moved at least a set distance based on a failure to receive the second received signal. The at least one threshold represents a characteristic of the second received signal corresponding to a first distance between the audio device and a wireless transmitter with which the transceiver is communicating. The second received signal is received by the transceiver. The device further includes a second wireless transceiver. The second received signal is received by the second wireless transceiver. The first wireless transceiver is a Bluetooth transceiver, the first received signal is a Bluetooth Classic signal, and the second received signal is one of a Bluetooth low energy (BLE) signal and a Bluetooth Serial Port Profile (SPP) signal. The state change of the audio device includes one or more of disabling the audio device, powering down the audio device, turning audio playback off on the audio device, providing a visual indication, and providing an audio indication. The state change occurs at a first set distance which is further from a transmitter with which the transceiver is communicating than a second set distance between the transmitter and transceiver. The state change of the audio device includes providing an audio indication to a user of the audio device that if they move further away from a transmitter with which the transceiver is communication, one or more of disabling the audio device, powering down the audio device, turning audio playback off on the audio device, providing a visual indication, and providing an audio indication will occur. The state change occurs at a first set distance which is closer to the transmitter than a second set distance.

In general, in another aspect, a method of providing security for a wireless audio device includes providing a wireless audio device having one or more electroacoustic transducers, a first wireless transceiver, and a processor. The processor processes audio signals received by the transceiver in a first received signal. The processed audio signals are communicated to the transducer(s) to cause the transducer(s) to output sound pressure waves. A characteristic of a second received signal independent of the first received signal is determined to surpass at least one threshold. A state of the audio device is changed based on the determining step.

Implementations may include one or more of the above and below features, in any combination. The processor is configured to determine that the audio device has been moved one or more set distances based on a failure to receive the second received signal.

In general, in another aspect, a wireless security system for a wireless audio device includes a wireless transmitter located at a base station. A wireless audio device has one or more electroacoustic transducers, a first wireless transceiver for communicating with the transmitter, and a processor configured to (a) process audio signals received by the transceiver in a first received signal and communicate the processed audio signals to the transducer(s) to cause the transducer(s) to output sound pressure waves, (b) determine that a characteristic of a second signal received from the transmitter and independent of the first received signal surpassed at least one threshold, and (c) change a state of the audio device based on the determining.

Implementations may include one or more of the above and below features, in any combination. The processor is configured to determine that the audio device has been moved one or more set distances from the transmitter based on the characteristic of the second received signal. The processor is configured to determine that the audio device has been moved one or more set distances from the transmitter based on a failure to receive the second received signal. The at least one threshold represents a characteristic of the second received signal corresponding to a first distance between the audio device and the wireless transmitter. The state change of the audio device includes providing an audio indication to a user of the audio device that if they move further away from the transmitter, one or more of disabling the audio device, powering down the audio device, turning audio playback off on the audio device, providing a visual indication, and providing an audio indication will occur.

Advantages include allowing a potential customer to try out a wireless audio device without physically tethering the device while still providing security for the device.

DETAILED DESCRIPTION

In the retail environment, it is desirable for consumers to be able to try out audio products (or devices), as the specific audible performance of a product is a very personal preference. In many retail environments, it is not possible or practical for sales staff to supervise every demonstration to assure an optimum demonstration or prevent theft of the product. For conventional audio systems that can be anchored to a wall or table, security is not a problem. Similarly, for wired headphones where the cable can be reinforced to prevent theft, securing demonstration models is not difficult. However, for the increasingly popular category of wireless audio products, and in particular wireless headphones, securing the product physically is challenging and may be annoying to consumers who want to try a wireless audio product in an untethered manner.

A solution to the problem of allowing consumers to try out wireless audio products in an untethered manner while still providing security for the product is to use a wireless security system. The consumer can pick up the wireless audio product and, in the case of wireless headphones, wear the product. If the consumer moves a first distance away from the demonstration area, they will be warned that moving further away will result in an action being taken such as disabling the product and/or issuing an audible and/or visible alarm. If the consumer then moves a second further distance away from the demonstration area, the product is disabled and/or an alarm is activated. The action taken at the second distance may not actually be the action threatened at the first distance.

Figure 1:
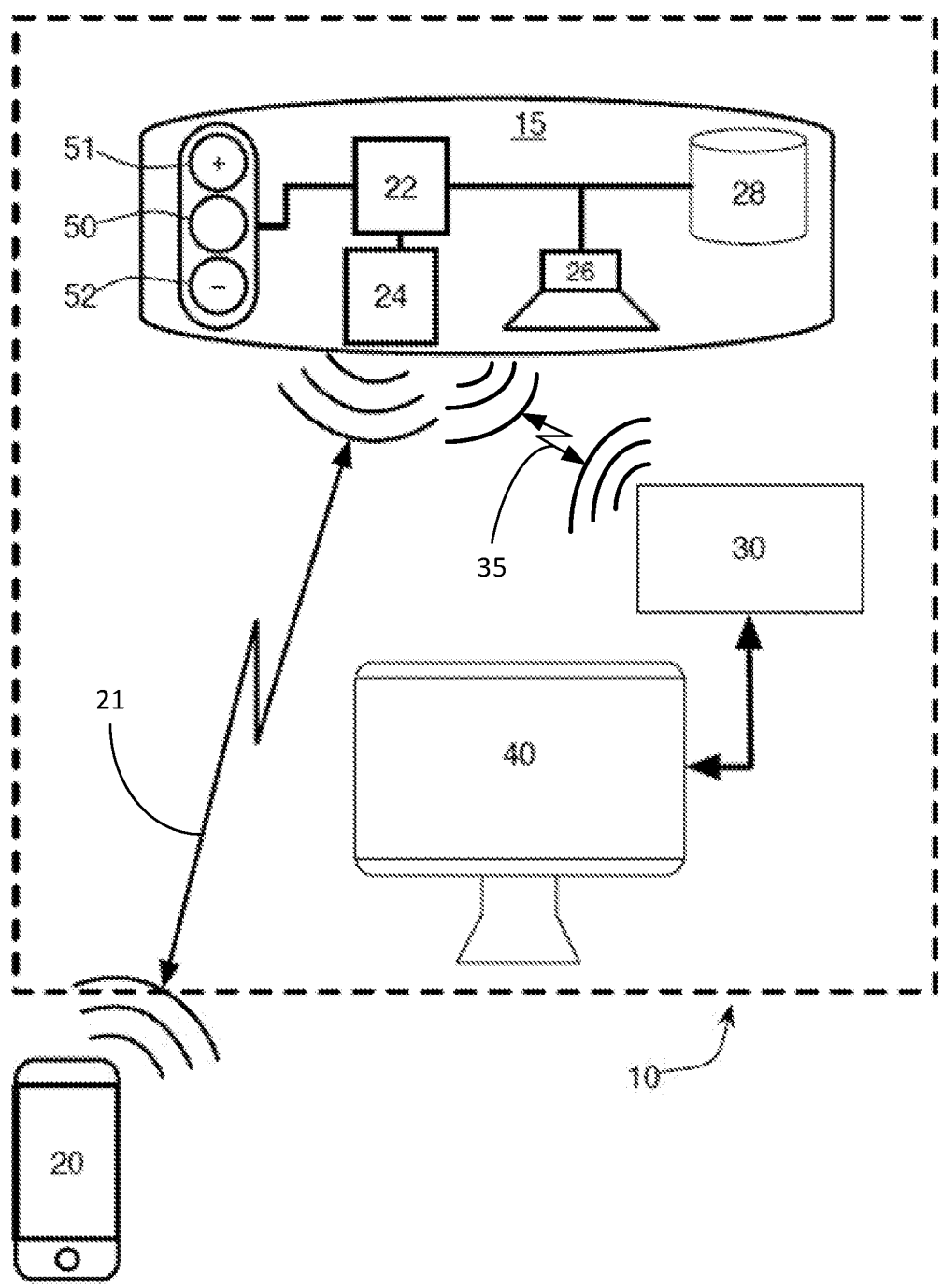
FIG. 1 is a block diagram of an exemplary wireless product demonstration system.

As shown in FIG. 1, an exemplary wireless product demonstration system (or base station) 10 includes a wireless audio device 15 (e.g., a loudspeaker or headphone), a demonstration system controller 30, and a demonstration display 40. A wireless connection (e.g., via a classic Bluetooth (BR/EDR or Bluetooth Low Energy (BLE) connection) 35 provides communication between the audio device 15 and a wireless transceiver (not shown, e.g., a Bluetooth transceiver) in the demonstration system controller 30. One or more wireless audio sources 20, i.e., the customer's source, is connected to the system 10 via a wireless connection 21 (e.g., via a Bluetooth Classic signal). Examples of the wireless audio source 20 include, but are not limited to, a smart phone, a hand-held music player, a portable computer, a smart watch, and so forth. In some examples, Bluetooth wireless technology is used to provide wireless communication between the audio device and the wireless audio source. The wireless audio device 15 includes a controller (or processor) 22, a wireless interface (or transceiver,) 24 (e.g. a Bluetooth transceiver), one or more electroacoustic transducers (e.g., speakers) 26, and a memory 28, as described in more detail below.

Figure 2:
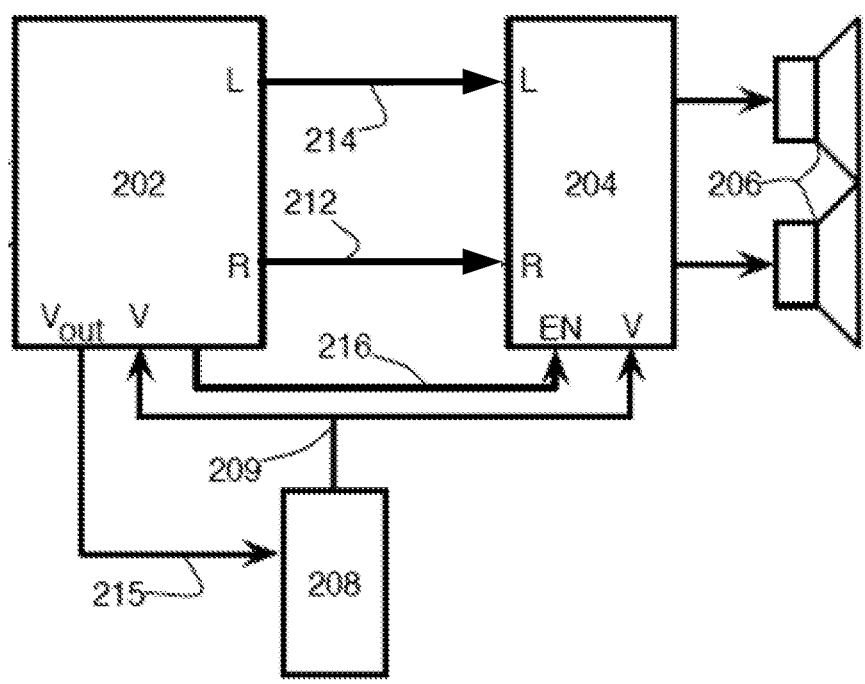
FIG. 2 is a partial circuit diagrams.

FIG. 2 shows a circuit for implementing the demonstration system of FIG. 1. A Bluetooth controller IC 202, such as a CSR8670 from Qualcomm Technologies International, Ltd., serves as both the Bluetooth interface circuitry and as a general microcontroller for the product, corresponding to both the controller 22 and the wireless interface 24 in FIG. 1. Additional components of the wireless interface, such as an antenna, are conventional and not shown. An amplifier IC 204, such as a TI TPA6141A2 from Texas Instruments Corporation, amplifies input audio signals to provide amplified output audio signals to a stereo pair of speakers 206, corresponding to the one or more speakers 26 in FIG. 1. A battery 208 provides power 209 to both the controller 202 and the amplifier 204, and is also charged by (or under the control of) the controller 202 via line 215. Audio signals 212, 214 are provided from the controller 202 to the amplifier 204. In the example of FIG. 2, the amplifier 204 has two input audio connections, for left and right stereo audio. In most cases, the wirelessly-received audio signals from the audio source 20 are digital, and are converted to analog signals before being output by the controller.

A control signal 216 from the controller 202 to the amplifier 204 enables the amplifier when the microcontroller code within the controller 202 calls for audio output. The amplifier 204 is only enabled when the wireless interface 24 is providing audio signals. Data provided over the wireless connection 35 may provide specific instructions from the demonstration controller 30 to the device controller 202. Data can also be transmitted back from the device controller 22 to the demonstration controller 30. While the various connections are each shown by single lines, and grounds are omitted, a person of skill in the art will appreciate that each of the connections may be differential or single-ended, may contain one or more than one signal line, and may be grounded in various ways.

This circuit thus allows the demonstration system to maintain an audio connection to the audio device. The audio connection can be mixed with audio from the paired wireless source device 20, allowing the customer to try out their own music while still hearing audible prompts from the demonstration system.

The circuitry of FIG. 2 also allows interactive control between the audio device 15 and the demonstration controller 30. The wireless connection 35 allows the audio device 15 to communicate with the demonstration controller 30 via BLE and coordinate the demonstration between the two, including doing so at the same time that the wireless interface 24 is used to receive the customer's own audio via Bluetooth Classic. Alternatively, a Serial Port Profile (SPP) connection can be used over Bluetooth Classic to send messages while audio is concurrently streaming over A2DP to allow the audio device 15 to communicate with the demonstration controller 30. In the example of FIG. 1, the wireless device 15 includes a user input, shown as a set of buttons 50, 51, 52. The wireless connection 35 can be used to communicate to the demonstration controller 30 that these buttons have been pressed.

Figure 3:
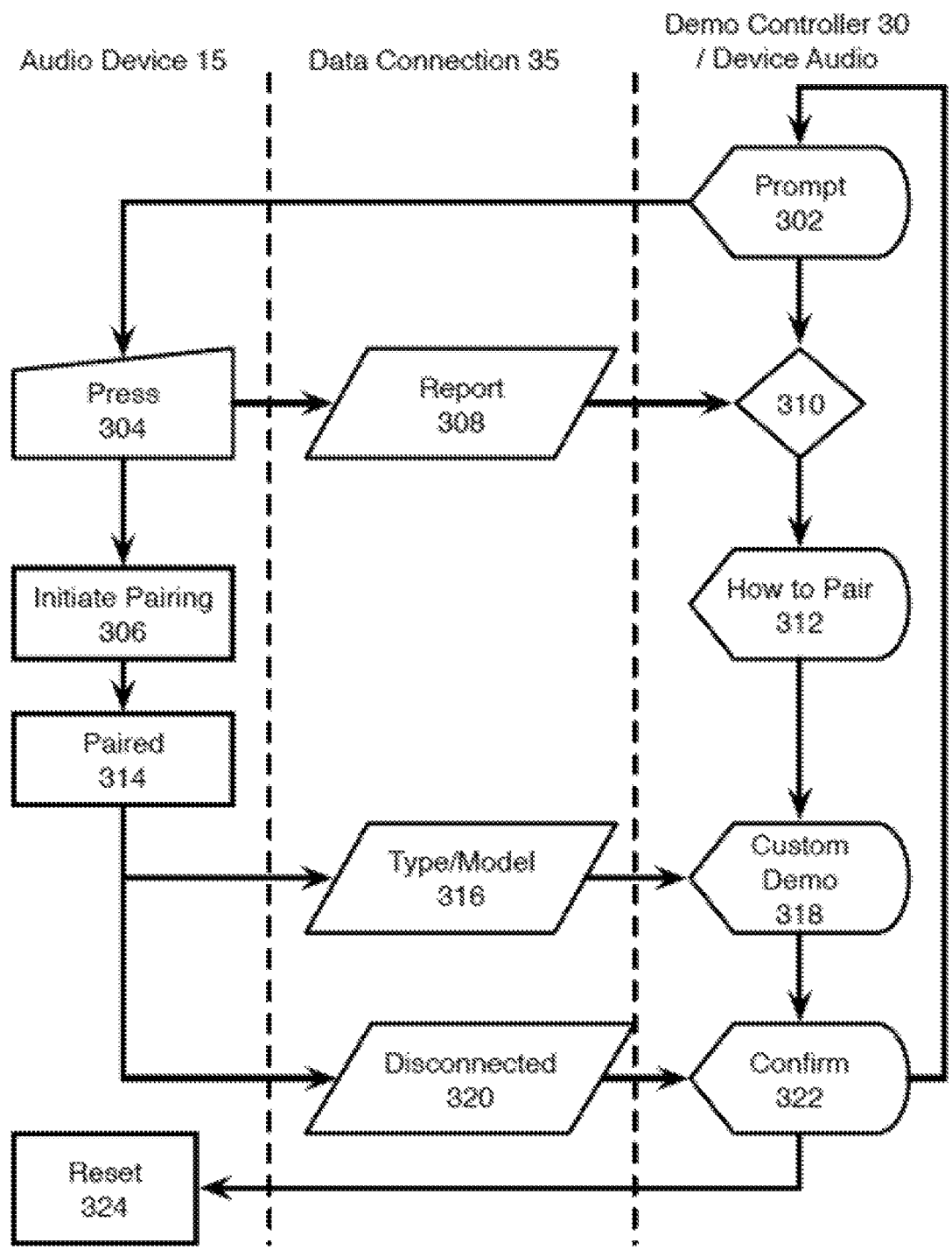
FIG. 3 is a flow diagram

FIG. 3 shows an example demonstration process flow. In the figure, actions handled by the portable audio device's processor 22 are shown on the left, actions handled by the demonstration controller 30, including audio output to the audio device 15 through the wireless connection 35, are shown on the right, and data communication between the two is in the middle. To guide the customer through pairing a smartphone to the audio device 15, the demonstration controller 30 can prompt (302) the customer to press the pairing button 50 on the audio device. The prompt can be delivered both audibly, through the wireless connection 35, and visually, through the display 40. When the customer complies (304), the audio device 15 not only initiates pairing (306), it reports (308) to the controller 30 that the customer has pressed the button. In other examples, the demonstration controller 30 may directly command the audio device 15 to initiate pairing.

After either the audio device 15 reports that the user initiated pairing or the demonstration controller 30 did that itself, the demonstration controller knows to move on (310) to the next prompt, e.g., telling (312) the customer to now find the audio device 15 in the pairing menu of their own device 20. Additional interactions may also be possible, for example, once paired (314), the audio device 15 may inform (316) the demonstration controller 30 about the type or model of the customer's device, allowing the demonstration to be tailored (318) to that device, e.g., emphasizing music playback if a music device is connected or communication capabilities of the headphones if a headphone is connected. The subsequent demonstration prompts can also be made specific to the user interface of the customer's device. Another status that may be communicated between the audio device 15 and the demonstration controller 30 is a notification when the customer's source device has been disconnected (320), whether because the customer walked out of range or because they manually disconnected their device. In response, the demonstration system may confirm (322) that the customer (if still present) is done with the demonstration, and reset (324) the audio device, e.g., by clearing its memory of paired devices and resetting any other parameters that the customer changed.

In some examples, the audio device 15 also includes volume controls 51 and 52. In many cases, such controls influence the level of the wireless audio played back by the device 15 and may be synchronized with a volume setting on the wireless audio source 20; they are not typically used to communicate over the wireless connection 35 connection. In the demonstration system 10, however, the data connection within the wireless connection 35 can be used to communicate that the volume controls 51 or 52 have been pressed, and the demonstration controller 30 will adjust the level of the demonstration audio provided to the audio device 15 accordingly.

The memory 28 in the audio device 15 may include any suitable memory technology, such as Read Only Memory (ROM), Random Access Memory (RAM), or flash ROM, to name a few examples. Among other things, the memory stores a microcode of a program for processing and controlling the processor 22 and a variety of reference data, data generated during execution of any of the variety of programs performed by the controller 22, and various updateable data for safekeeping such as a phone book, outgoing messages, incoming messages and the like. Different types of data may be stored in different types of memory. The memory includes executable code for general operation of the wireless playback device.

The wireless interface 24 enables a wireless connection using Radio Frequency (RF) communication between the audio device 15 and the wireless audio source 20. The wireless interface 24 exchanges a radio signal including data input/output through an antenna (not shown). For example, when using Bluetooth wireless technology in a transmission mode, the wireless interface 24 processes data by channel coding and spreading, converts the processed data into a Radio Frequency (RF) signal and transmits the RF signal. In a reception mode, the wireless interface 24 converts a received RF signal into a baseband signal, processes the baseband signal by de-spreading and channel decoding and restores the processed signal to data.

Each of the source devices, audio source 20 for example, can include a processor, a memory, and a wireless communication module implementing Bluetooth or other appropriate wireless technology (not shown). The particular construction and technology of the source devices is not within the scope of this disclosure, except to note that wireless communication module is compatible with the wireless interface 24 of the audio device 15, such that it interacts with the audio device in the manner described above.

Referring again to FIG. 1, the processor 22 processes audio signals received by the wireless interface 24 in a first received signal over the wireless connection 21 and communicates the processed audio signals to the transducer 26 to cause the transducer to output sound pressure waves. The processor 22 also can determine that a characteristic of a second signal received via the BLE wireless connection 35, independent of the first received signal, surpasses at least one threshold. For example, the characteristic that can be monitored by the processor 22 can be the RSSI values (Received Signal Strength Indication) which are a measure of signal level. When the processor 22 determines that the signal level has dropped to a point where it surpasses a set threshold value, a state of the audio device 15 is changed.

The processor 22 can be configured to determine that the audio device 15 has been moved one or more set distances from the processor 30 based on the characteristic of the second received signal. The processor 22 can be configured to determine that the audio device 15 has been moved at least a set distance from the processor 30 based on a failure to receive the second received signal. The at least one threshold can represent a characteristic of the second received signal corresponding to a first distance between the audio device 15 and a wireless transmitter in the processor 30 with which the wireless interface 24 is communicating.

The state change of the audio device 15 mentioned above can include one or more of disabling the audio device, powering down the audio device, turning audio playback off on the audio device, providing a visual indication (e.g. a flashing light), providing a haptic indication (e.g. a vibration of the audio device 15), and providing an audio indication (e.g. a warning chime or a verbal warning). The state change can occur at a first set distance which is further from a transmitter in the processor 30 with which the wireless interface 24 is communicating than a second set distance between the transmitter and transceiver.

The state change of the audio device 15 can include providing an audio indication to a user of the audio device that if they move further away from a transmitter in the processor 30 with which the wireless interface 24 is communication, one or more of disabling the audio device, powering down the audio device, turning audio playback off on the audio device, providing a visual indication, and providing an audio indication will occur. The state change can occur at a first set distance which is closer to the transmitter in the processor 30 with which the wireless interface 24 is communicating than a second set distance between the transmitter and interface 24.

Figure 4:
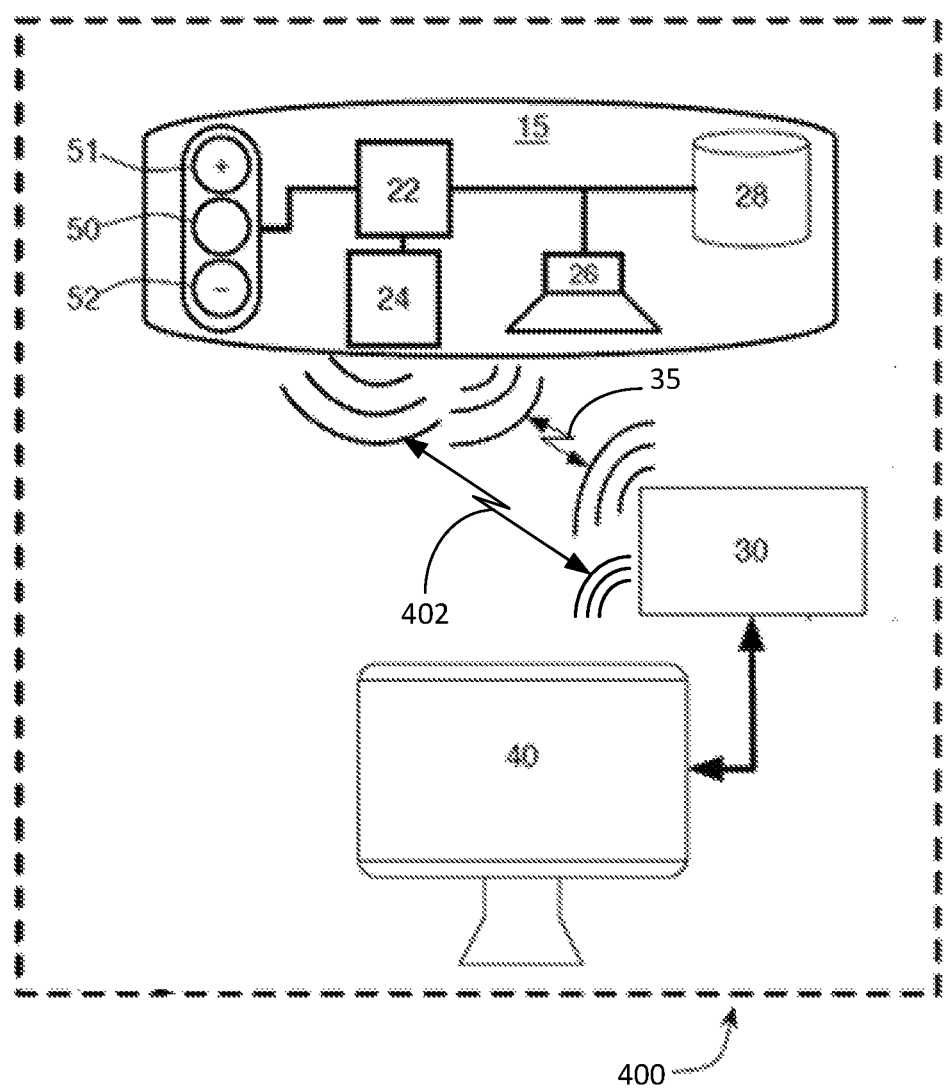
FIG. 4 is a block diagram of another example of a wireless product demonstration system.

As shown in FIG. 4, another example of a wireless product demonstration system 400 is shown which has many similarities to the system shown in FIG. 1. A wireless connection (e.g., via a Bluetooth low energy (BLE) or Serial Port Profile (SPP)) 35 provides communication between the audio device 15 and the wireless transceiver (not shown) in the demonstration system controller 30. Instead of connecting the audio device 15 to the audio source 20 (which has been eliminated), the audio device 15 is connected to the controller 30 via a wireless connection 402 (e.g., via a Bluetooth Classic signal). In some examples, Bluetooth wireless technology is used to provide wireless communication between the audio device 15 and the wireless audio source. As such, the controller 30 can provide an audio program to the audio device 15 which can play the audio program. Any signal in the wireless connection 35 is considered to be independent of any signal in the wireless connection 402 even though there is preferably only a single transceiver in the processor 30 and a single transceiver in the wireless interface 24. This also applies to the example in FIG. 1 for signals transmitted over wireless connections 21 and 35.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic. While given components of the system have been described separately, one of ordinary skill will appreciate that some of the functions may be combined or shared in given instructions, program sequences, code portions, and the like.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. Accordingly, other implementations are within the scope of the following claims.

What is claimed is:

1. A wireless audio device, comprising:
one or more electroacoustic transducers;
a first wireless transceiver; and
a processor configured to
(a) process audio signals received by the transceiver in a first received signal and communicate the processed audio signals to the transducer(s) to cause the transducer(s) to output sound pressure waves,
(b) determine that a characteristic of a second received signal independent of the first received signal surpassed at least one threshold, and
(c) change a state of the audio device based on the determining, wherein the processor is configured to determine that the audio device has been moved one or more set distances based on the characteristic of the second received signal;
wherein the state change of the audio device includes providing an audio indication to a user of the audio device that if they move farther away from a transmitter with which the transceiver is communicating, one or more of disabling the audio device, powering down the audio device, turning audio playback off on the audio device, providing a visual indication, and providing an audio indication will occur.

2. The audio device of claim 1, wherein the processor is configured to determine that the audio device has been moved at least a set distance based on a failure to receive the second received signal.

3. The audio device of claim 1, wherein the at least one threshold represents a characteristic of the second received signal corresponding to a first distance between the audio device and a wireless transmitter with which the transceiver is communicating.

4. The audio device of claim 1, wherein the second received signal is received by the transceiver.

5. The audio device of claim 1, further including a second wireless transceiver, wherein the second received signal is received by the second wireless transceiver.

6. The audio device of claim 1, wherein the first wireless transceiver is a Bluetooth transceiver, the first received signal is a Bluetooth Classic signal, and the second received signal is one of a Bluetooth low energy (BLE) signal and a Bluetooth Serial Port Profile (SPP) signal.

7. The audio device of claim 1, wherein the state change of the audio device includes one or more of disabling the audio device, powering down the audio device, turning audio playback off on the audio device, providing a visual indication, and providing an audio indication.

8. The audio device of claim 7, wherein the state change occurs at a first set distance which is further from a transmitter with which the transceiver is communicating than a second set distance between the transmitter and transceiver.

9. The audio device of claim 1, wherein the state change occurs at a first set distance which is closer to the transmitter than a second set distance.

10. A method of providing security for a wireless audio device, comprising:
providing a wireless audio device having one or more electroacoustic transducers, a first wireless transceiver, and a processor;
processing by the processor audio signals received by the transceiver in a first received signal;
communicating the processed audio signals to the transducer(s) to cause the transducer(s) to output sound pressure waves;
determining that a characteristic of a second received signal independent of the first received signal surpasses at least one threshold, and
changing a state of the audio device based on the determining step, wherein the state change of the audio device includes one or more of disabling the audio device, powering down the audio device, turning audio playback off on the audio device, providing a visual indication, and providing an audio indication;
wherein the state change of the audio device includes providing an audio indication to a user of the audio device that if they move farther away from a transmitter with which the transceiver is communicating, one or more of disabling the audio device, powering down the audio device, turning audio playback off on the audio device, providing a visual indication, and providing an audio indication will occur.

11. The method of claim 10, wherein the processor is configured to determine that the audio device has been moved one or more set distances based on the characteristic of the second received signal.

12. The method of claim 10, wherein the processor is configured to determine that the audio device has been moved one or more set distances based on a failure to receive the second received signal.

13. The method of claim 10, wherein the at least one threshold represents a characteristic of the second received signal corresponding to a first distance between the audio device and a wireless transmitter with which the transceiver is communicating.

14. The method of claim 10, wherein the providing step further provides a second wireless transceiver, wherein the second received signal is received by the second wireless transceiver.

15. The method of claim 10, wherein the first wireless transceiver is a Bluetooth transceiver, the first received signal is a Bluetooth Classic signal, and the second received signal is a Bluetooth low energy (BLE) signal.

16. A wireless security system for a wireless audio device, comprising:
a wireless transmitter located at a base station; and
a wireless audio device having one or more electroacoustic transducers, a first wireless transceiver for communicating with the transmitter, and a processor configured to
(a) process audio signals received by the transceiver in a first received signal and communicate the processed audio signals to the transducer(s) to cause the transducer(s) to output sound pressure waves, (b) determine that a characteristic of a second signal received from the transmitter and independent of the first received signal surpassed at least one threshold, and (c) change a state of the audio device based on the determining, wherein the at least one threshold represents a characteristic of the second received signal corresponding to a first distance between the audio device and the wireless transmitter;

wherein the state change of the audio device includes one or more of disabling the audio device, powering down the audio device, turning audio playback off on the audio device, providing a visual indication, and providing an audio indication.

17. The security system of claim 16, wherein the processor is configured to determine that the audio device has been moved one or more set distances from the transmitter based on the characteristic of the second received signal.

18. The security system of claim 16, wherein the processor is configured to determine that the audio device has been moved one or more set distances from the transmitter based on a failure to receive the second received signal.

19. The security system of claim 16, wherein the second received signal is received by the transceiver.

20. The security system of claim 16, further including a second wireless transceiver, wherein the second received signal is received by the second wireless transceiver.

21. The security system of claim 16, wherein the first wireless transceiver is a Bluetooth transceiver, the first received signal is a Bluetooth Classic signal, and the second received signal is a Bluetooth low energy (BLE) signal.

22. The security system of claim 16, wherein the state change of the audio device includes providing an audio indication to a user of the audio device that if they move further away from the transmitter, one or more of disabling the audio device, powering down the audio device, turning audio playback off on the audio device, providing a visual indication, and providing an audio indication will occur.

* * * * *